US006970462B1

(12) United States Patent
McRae

(10) Patent No.: US 6,970,462 B1
(45) Date of Patent: Nov. 29, 2005

(54) METHOD FOR HIGH SPEED PACKET CLASSIFICATION

(75) Inventor: Andrew McRae, Berowra (AU)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/557,480

(22) Filed: Apr. 24, 2000

(51) Int. Cl.$^7$ .......................... H04L 12/28; H04L 12/56
(52) U.S. Cl. ...................................................... 370/392
(58) Field of Search ........................... 370/389, 392, 370/395.31, 395.32; 707/2

(56) References Cited

U.S. PATENT DOCUMENTS

| 5,027,350 | A | | 6/1991 | Marshall | 370/401 |
|---|---|---|---|---|---|
| 5,473,607 | A | | 12/1995 | Hausman et al. | 370/392 |
| 5,852,607 | A | | 12/1998 | Chin | 370/401 |
| 5,872,783 | A | | 2/1999 | Chin | 370/392 |
| 5,881,242 | A | | 3/1999 | Ku et al. | 709/238 |
| 5,917,820 | A | | 6/1999 | Rekhter | 370/392 |
| 5,951,651 | A | * | 9/1999 | Lakshman et al. | 709/239 |
| 6,091,725 | A | | 7/2000 | Cheriton et al. | 370/392 |
| 6,219,706 | B1 | | 4/2001 | Fan et al. | 709/225 |
| 6,289,013 | B1 | * | 9/2001 | Lakshman et al. | 370/389 |
| 6,449,256 | B1 | * | 9/2002 | Varghese et al. | 370/238 |
| 6,529,508 | B1 | * | 3/2003 | Li et al. | 370/392 |
| 6,643,260 | B1 | * | 11/2003 | Kloth et al. | 370/235 |
| 6,665,293 | B2 | * | 12/2003 | Thornton et al. | 370/352 |

OTHER PUBLICATIONS

SIGCOMM '99 Session Archive. Sep. 9, 1999.*
Pankaj Gupta and Nick McKeown, Packet Classification on Multiple Fields Sep. 2, 1999.

Dawson R. Engler and M. Frans Kaashoek, DPF: Fast, Flexible Message Demultiplexing using Dynamic Code Generation, 1996, pp. 53-59.
T.V. Lakshman and D. Stiliadis, High-Speed Policy-based Packet Forwarding Using Efficient Multi-dimensional Range Matching, 1998, pp. 203-214.
U.S. Appl. No. 09/162,730, filed Sep. 29, 1998, Ullum et al.
U.S. Appl. No. 09/535,810, filed Mar. 28, 2000, Gai et al.
U.S. Appl. No. 09/688,895, filed Oct. 16, 2000, Wu et al.

* cited by examiner

Primary Examiner—Dang Ton
Assistant Examiner—Kevin C. Harper
(74) Attorney, Agent, or Firm—Cesari and McKenna, LLP

(57) ABSTRACT

The present invention allows for processing classification and/or security filtering rules by using bitmaps as representations. In one instance, the packet header involved in the packet classification is divided into sections (fields) such as 16 bit portions. Once, this is performed, a data lookup table is built for each of the packet header fields. In particular, a bitmap is created representing which filter rules match a certain packet header field value. The created data lookup tables, typically one for each packet header field, are merged to form intermediate level data lookup tables. The intermediate level data lookup tables are continuously merged until one final data lookup table is formed. The result of the final data lookup table represents all the possible packets to be classified. Thus, each final data entry has a bitmap representing the filtering rules that matches this entry. The bitmap can be used to selectively provide a desired result of the classification. For instance, a first matching rule is represented by the first bit set in the bitmap; the best matching rule is determined by processing the bitmap and selecting the most appropriate rule; and a complete set of rules that match is represented by the full bits set in the bitmap.

31 Claims, 11 Drawing Sheets

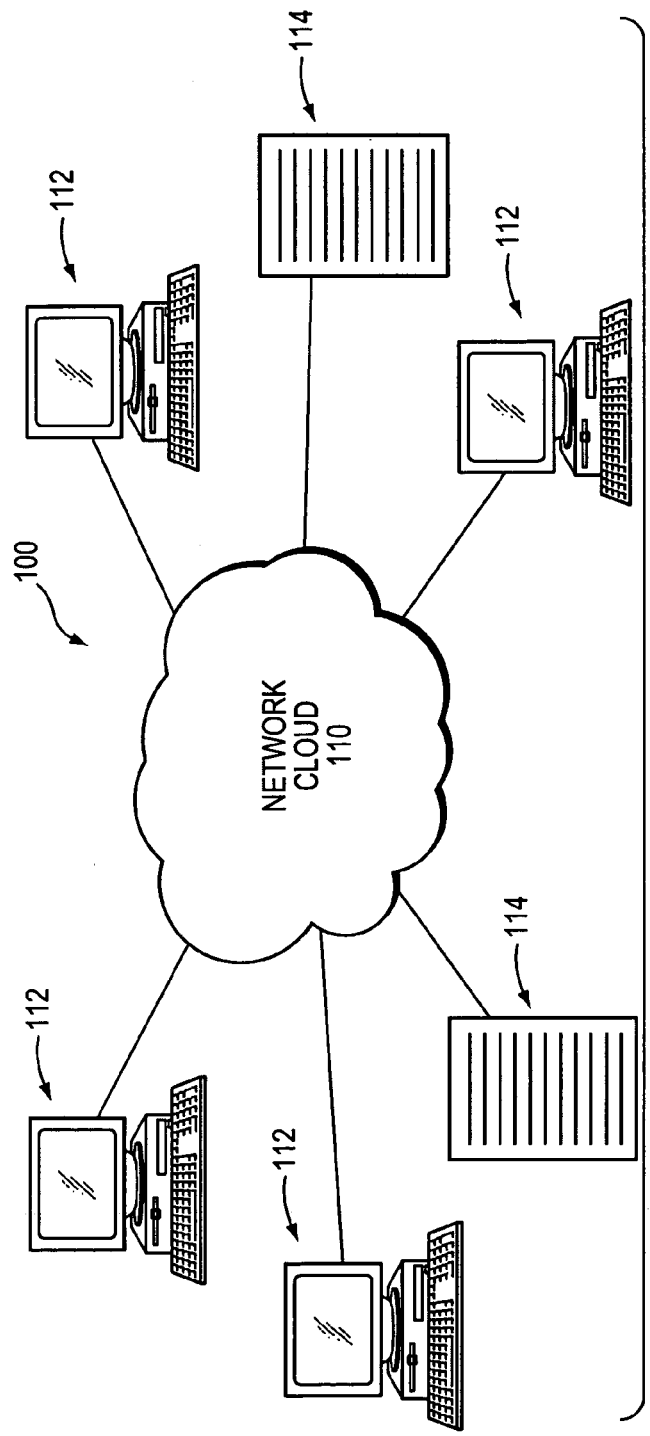
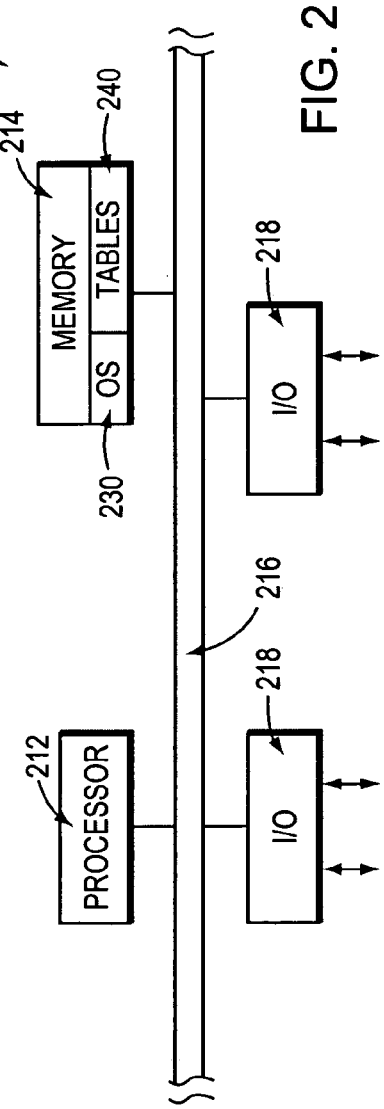

UPPER 16 BITS OF IP SOURCE

| INDEX | BITMAP |
|---|---|
| 0 | 0 0 0 1 1 |
| 1 | 1 1 0 1 1 |
| 2 | 0 0 1 1 1 |

LOWER 16 BITS

| INDEX | BITMAP |
|---|---|
| 0 | 0 0 0 1 1 |
| 1 | 1 1 1 1 1 |

NEW LOOKUP TABLE

[0,0]
[0,1]
[1,0]
[1,1]
[2,0]
[2,1]

NEW EQUIVALENCE SET

| INDEX | BITMAP |
|---|---|
| 0 | 0 0 0 1 1 |
| 1 | 1 1 0 1 1 |
| 2 | 0 0 1 1 1 |

FIG. 11

METHOD FOR HIGH SPEED PACKET CLASSIFICATION

BACKGROUND OF THE INVENTION

1. Field of the Invention

The invention relates generally to the classification and/or filtering of data packets, and in particular, to the high speed filtering and/or classification of data packets.

2. Background Information

Various systems use access control lists (ACLs) to provide security, filtering and so forth. In the context of a networking system, besides security control, an ACL provides for packet classification that could be used in a range of applications such as quality of service parameters, queuing classes or other actions. In fact, an ACL could be viewed as a set of rules, with each rule having an associated value, class or action. For instance, the ACL, once matched, may indicate to a router what type of action should be performed on the matched packet. In its simplest form, the action may be to allow the matched packet to proceed towards its destination (i.e., "permit"). Conversely, if there is no match, the action may be to drop the packet (i.e., "deny"). In a more sophisticated form, complex policies and filtering rules may be implemented in the ACL to determine the course of the data packet.

There are instances where ACLs are sequential in nature, in which an incoming or an outgoing packet is sequentially compared against a list of rules. A system could have thousands of access rules and it is not uncommon to have hundreds of rules in an ACL. There are many instances in which the rules are quite complex, providing a capability of checking source and destination addresses, protocol selection (such as Transmission Control Protocol (TCP), User Datagram Protocol (UDP) and etc.), layer 4 (L4) port numbering and so forth. Stated differently, the more complex a rule becomes, the longer it takes for a processor to process that rule. Because a processor processes literally by comparing each rule sequentially with a packet until a match is found, the classification performance is highly dependent on the complexity of the rules and is processor intensive. Another problem is the non-determinism of the match in which the processing time is dependent on which rule the packet matches (i.e., the earlier the match is found, the shorter the processing time).

One method of obtaining a faster access is to predetermine the frequency of access of the various rules and to place the most selected ones at the top of the list. However, this method is highly dependent on the packet mix of the networking system and is not readily scalable. A delay in its worst scenario is when no rule matches, in which case, the processor performs a default rule. In a permit/deny action, the default rule is usually a "final deny rule." Additionally, an implicit attribute of a sequentially searched access list is the rule that is matched is the "first matching rule" and is not necessarily the "best matching rule" which may occur further down the list.

SUMMARY OF THE INVENTION

There is a need for matching a packet with an ACL in a manner that is faster than a sequential search, uses reasonable memory space, and may be performed with determinism (i.e., predictable interval) regardless of the size of the ACL or complexity of the access rules and provides for a choice of matching rules.

The present invention comprises a technique for processing classification and/or security filtering rules using bitmaps as representations. In one example, a packet header involved in the packet classification is divided into sections (fields) such as 16 bit portions. Thereafter, a first-level data lookup table is built for each of the fields by iterating from 0 to a maximum value of the packet header field being processed. For each iteration, a bitmap is created representing which filter rules match this particular value. Each bit position of the bitmap represents a rule in the ACL. Each created bitmap is compared with the previously created bitmaps for this field, if any, to determine if there is a matching bitmap. If there is a match, the equivalence set index of the matching bitmap is assigned to the packet header field value currently being processed. An equivalent set is a set of unique values that represents unique bitmaps for a particular field.

If there are no matching bitmaps, a new entry is created which has a new equivalence set index value and the created bitmap is assigned to it. Thus, the first level lookup tables are formed with the equivalence set indices and their corresponding bitmaps. Next, the first lookup tables are "cross-producted" to form intermediate lookup tables, if any. The cross-producting creates yet another equivalence set indices and related bitmaps. The intermediate lookup tables are further cross-producted until eventually a single table is left, which is the final lookup table. The final lookup table comprises the final bitmaps that provides for all theoretically possible combinations of outcomes given in any packet header values. Stated differently, for any possible outcome, there is a bitmap indicating which rules are matching.

The bitmap can be used to selectively provide a desired result of the classification. For instance, a first matching rule is represented by the first bit set in the bitmap. The best matching rule is then determined by processing the bitmap and selecting the most appropriate rule; a complete set of matching rules is represented by the assertion of all bits in the bitmap.

Other advantages and features will be apparent in the detailed description to follow.

BRIEF DESCRIPTION OF THE DRAWINGS

The invention description below refers to the accompanying drawings, of which:

FIG. 1 depicts a conventional network in which an embodiment of the invention may be implemented;

FIG. 2 shows an example of a network device with an embodiment of the invention implemented;

FIG. 11 illustrates equivalence sets of lookup tables being cross-producted to form a new equivalence set for a next level table.

DETAILED DESCRIPTION OF AN ILLUSTRATIVE EMBODIMENT

Figure 3:
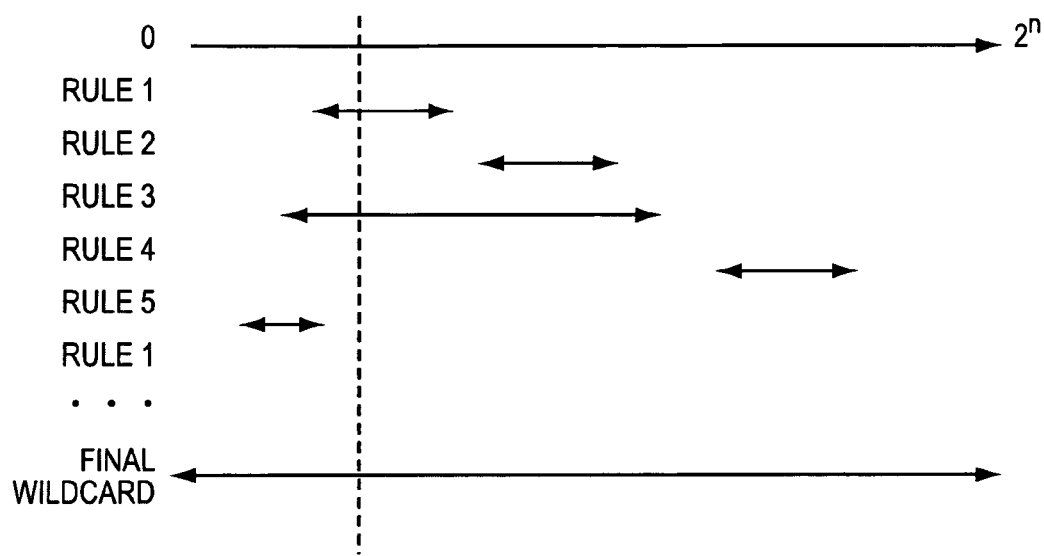
FIG. 3 shows a field as an interval in a one-dimensional scale along with rules expressed as a subset of the interval.

In accordance with the invention, representations of packet classification rules are created as bitmaps which are indexed by lookup tables for packet classifications.

The invention may be implemented in a network 100, as shown in FIG. 1. The network may include a network cloud 110 which may be a combination of transmission lines, backbones, switches, routers and repeaters, dependent on the extent of the network, and allows various devices connected to the network to communicate with each other. These various devices may include simple computers such as personal computers (PCs) and workstations 112, that transmit or receive data, or they may be sophisticated resource servers 114 that store various resources. For instance, the Internet is a giant web that connects large numbers of these simple computers and resource servers together for the interchange of information. Information flows in packets wherein an attached header includes source and destination addresses, among others, that inform the devices encountered in the web as to how the packets are to be forwarded.

For various reasons such as quality of service or security, access control lists (ACLs) may be used by various devices in the web, including the computers and the resource servers themselves. FIG. 2 illustrates a network device 200 such as a router with an ACL that is used for classification of receiving packets, for example. In particular, the ACL is composed of a plurality of data lookup tables 240 constructed in accordance with the invention soon to be described. The router comprises a processing unit 212 and a memory unit 214 coupled together by a bus 216. Further coupled to the bus may be a plurality of input/output (I/O) interfaces 218 that interact with other routers and devices within the network. In one example, an operating system (OS) 230 resides in the memory unit 214 along with the data lookup tables 240. Together, they facilitate in the classification of the receiving packets when executed by the processing unit 212. In one instance, the classification of the packets pertains to the type of quality of service a packet is to receive.

The memory unit 214 in which the data lookup tables 240 reside may be a volatile memory such as a Dynamic Random Access Memory (DRAM). The data lookup tables 240 may also reside in a non-volatile memory such as a Read Only Memory (ROM) or a Flash memory. Further, the data lookup tables may be stored in a storage medium such as a magnetic or an optical disk. Collectively, the mentioned memories, storage mediums and the like will be referred to as a processor executable medium. Additionally, the data lookup tables may be configured in hardware such as a content addressable memory (CAM) or an application specific integrated circuit (ASIC).

An action of matching a packet against a database of rules (or rulesets) can be implemented as a memory lookup. For instance, if a packet header has a total of 114 bits (each Internet Protocol (IP) address: 32 bits, each layer 4 (L4) port number: 16 bits, 8 bit protocol, 8 bit type of service (TOS)/Precedence, flags: 2 bits), the 114 bits could be used as an entry to a memory bank such as a CAM to classify the incoming packets. While this guarantees that every incoming packet would be classified, the memory size involved would make the implementation impractical.

An observation is made that the rules themselves need not treat the packet header as one single header, but instead, each packet header field could be treated separately. For example, each rule can separately specify values for IP source and destination addresses, IP protocol and etc. Some fields may have implicit dependence, such as when L4 port numbers are specified, the IP protocol may need to be specified as either a Transmission Control Protocol (TCP) or a User Datagram Protocol (UDP). In instances where each rule makes no reference to a particular field, such as a 32 bit IP source address, an assumption can be made that all values of this field will match (i.e., a wildcard). A wildcard IP address can be simply treated as a value of zeros and a mask of zeros.

One way of viewing a field is to consider it as an interval in a one-dimensional scale with values from 0 to $2^n$ where n is the number of bits in the field as shown in FIG. 3. Each rule to be considered can be expressed as a ruleset of the above interval, either as a point (a single value with a 255.255.255.255 mask), an interval (a value with a contiguous mask, e.g., 192.55.99.0/255.255.255.0) or as a set of intervals (such as a noncontiguous mask, e.g., 192.55.0.1/255.255.0.255). When a packet is to be matched against a ruleset, a point on the interval representing a packet value is used to create an intersecting line. A rule matches this packet value if the line intersects the interval of the rule. The first rule that the line intersects is the first matching rule. Thus, the process of determining which rules match is expressed in terms of determining which intervals (i.e., rules) belong to any particular point on the one-dimensional scale.

Figure 4:
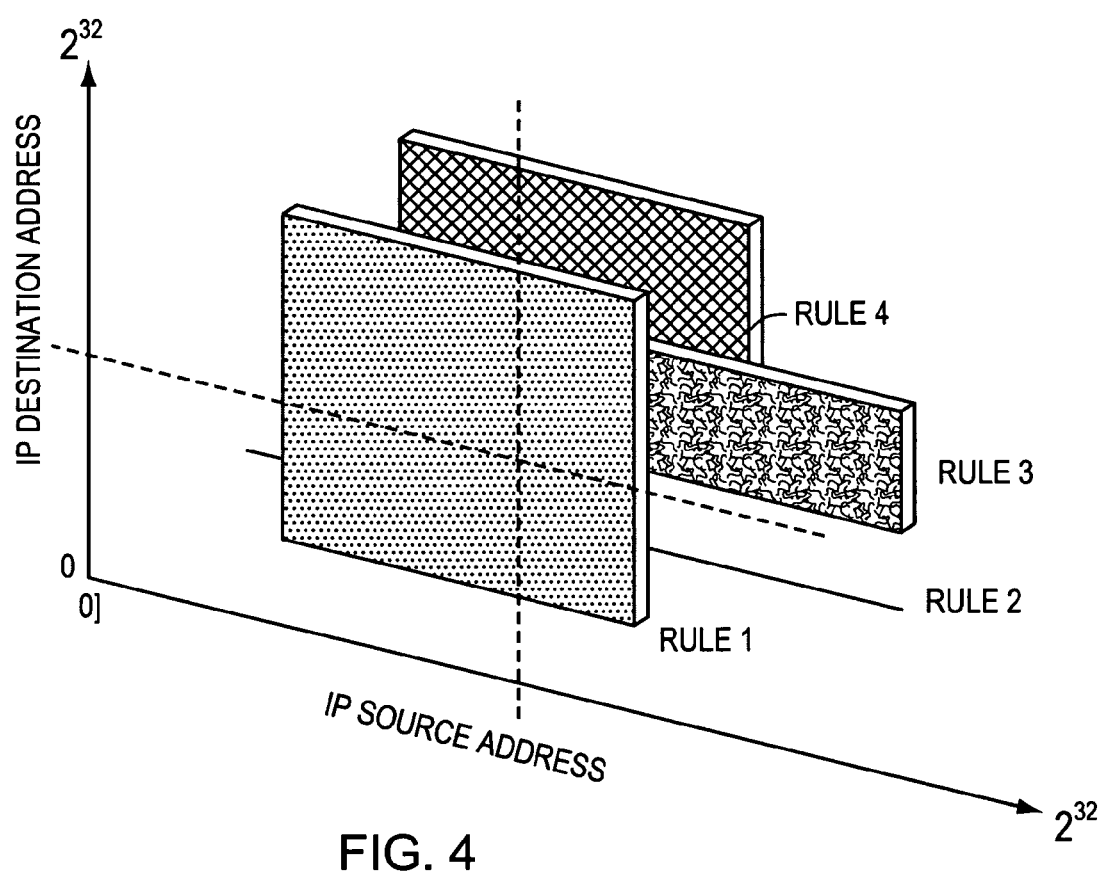
FIG. 4 shows how a second field can be added to the one dimensional scale in FIG. 3 to form a two-dimensional scale.

Another observation is that in an access control list (ACL), each packet field is disjoint from the others (with certain exceptions). For example, the source IP address and the destination IP address can be specified separately and matched separately because they have no intrinsic relationship in the packet matching process. This property can be used to expand the above model of matching points in a set of intervals by considering other fields as separate dimensions. FIG. 4 shows how a second field (e.g., IP destination address) can be added to the existing IP source address dimension. Each rule has a value/mask for both the IP source and destination addresses, and is represented as an interval. When plotted on a two-dimensional scale, intervals for each field which matches a rule sweep out an area that represents a portion of space where the rule matches both fields. For instance, rules that have a 255.255.255.255 mask in both fields are represented by a point, and rules in which one field has a 255.255.255.255 mask appear as a line. Accordingly, the region that each rule covers indicates the area in which the packets can match.

The process of expanding the dimensions of the ruleset space can further continue to accommodate other fields required in packet matching (e.g., IP source & destination, TOS and precedence, protocol, L4 source and destination port). Once a set of regions is discovered, the next step is to select the appropriate region from the matching set. Thus, matching a packet is a case of discovering in which regions a single point lies in an N-dimensional space given that the rulesets are defining the regions in each dimension, and the packet field values determine the location of the single point in that space.

So far there are considerable references that describe this. For further reading, a paper of interest is Pankaj Gupta and Nick McKeown, "Packet Classification on Multiple Fields," Proc. Sigcomm, September 1999, Harvard University. However, the method described generally suffers from either a large memory requirement or from excessive processing. In general, it is very difficult to create a viable algorithm that takes into consideration the complete possible combinations of the packet header fields.

Another observation is made that the pattern of data in both the rules and the packets being matched are usually limited to a small subset of possible data range. For example, TCP port numbers have a range from 0 to 65535. However, in reality, only a small number of those port numbers are of any real interest. This allows for a large degree of compression to take place.

As a comparison, the sequential searching of the ACL is analogous to matching the packet by moving through the different regions of the rulesets and checking whether the packet lies within all regions of the rule. This is in effect saying "given a set of regions representing the rule, check each one to see if this packet lies within the region."

In accordance with the invention, a more efficient approach would be to say "given a packet, determine the set of regions that this packet lies and then select the best (or first) matching rule. In other words, instead of matching the rules to the packet, the packet values are used to deterministically arrive at the matching rules.

Figure 5:
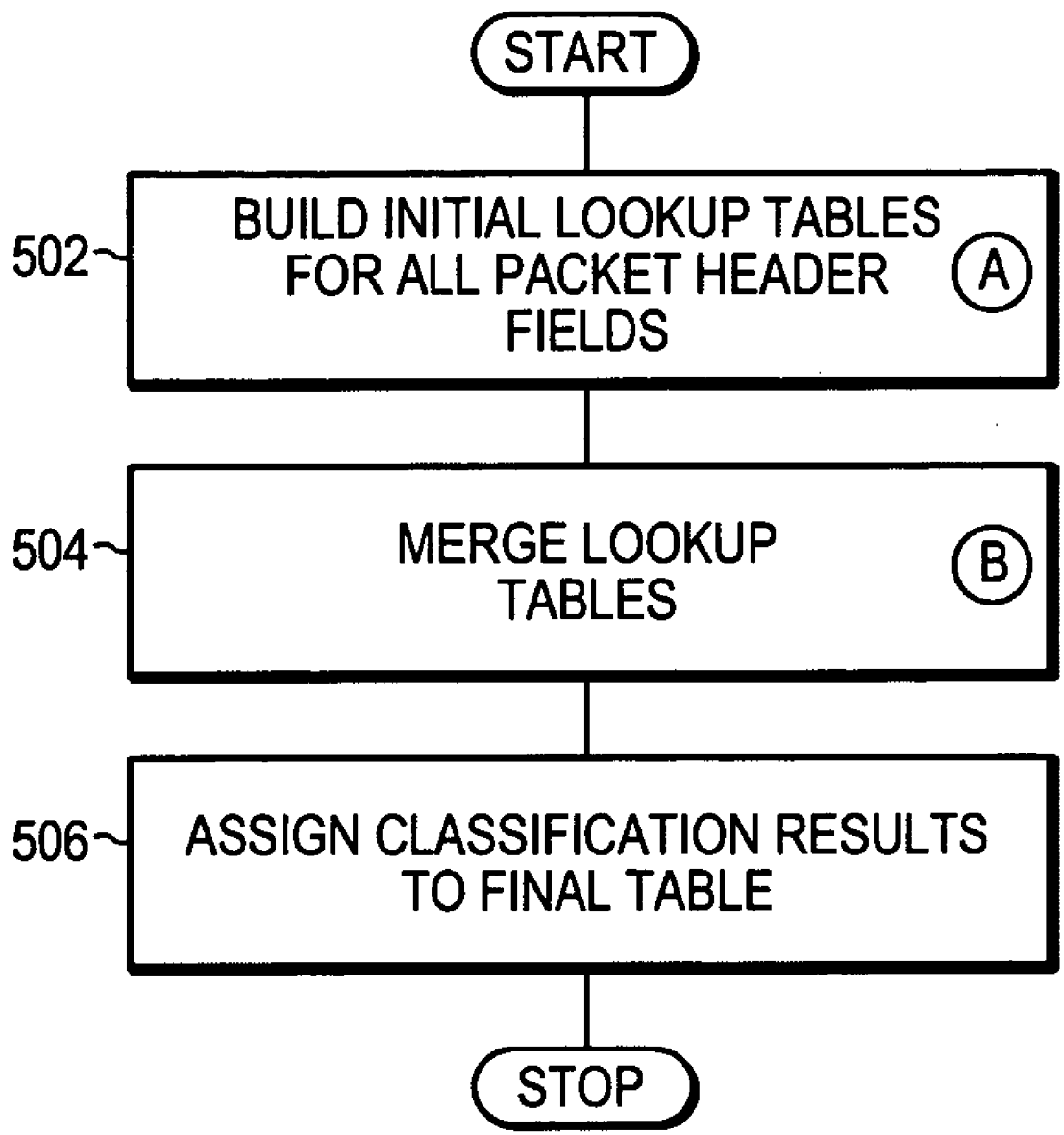
FIG. 5 shows an exemplary flow diagram that depicts the creation of data lookup tables for data packets.

With this concept in mind, FIG. 5 shows an exemplary procedure that allows for the creation of data tables for header values that match against a set of classification rules. Briefly, in block 502, the packet header involved in the packet classification is divided into sections (fields) such as 16 bit portions. Once, this is performed, a data lookup table is built for each of the packet header fields. In particular, a bitmap is created for each header field value to represent the matching filter rules. In block 504, the created data lookup tables, typically, one for each packet header field, is merged two at a time to form intermediate second level data lookup tables, if any. Thus, if there are 8 initial data lookup tables, they are merged two at a time to produce 4 second level data lookup tables. The second level data lookup tables are then merged two at a time to form intermediate third level lookup tables. The merging proceeds until one final data lookup table is formed. Note that the procedure is not limited to merging of two tables at a time, but the technique may be had to merge three or more tables at a time until a final table is formed. In block 506, the final table is formed and the classification results are assigned to the table. The results in the final data lookup table represent all the possible packets to be classified. Thus, each packet header entry has a bitmap representing the filtering rules that matches this entry. The bitmap can be used to selectively provide a desired result of the classification. For instance, a first matching rule is represented by the first bit set in the bitmap; the best matching rule is determined by processing the bitmap and selecting the most appropriate rule; and a complete set of rules that match is represented by the full bits set in the bitmap.

The run time operation, on average, is faster than the sequential access list, and further, is deterministic (i.e. no matter how many entries there are in the ACL, the same number of processor cycles are consumed). The passages to follow will now describe in detail the mechanics of how the data tables are created.

Figure 6:
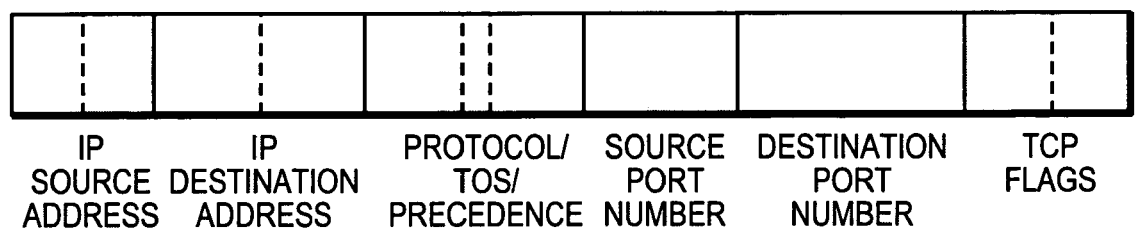
FIG. 6 depicts the splitting of the data network packet headers into portions to form data lookup tables.

As previously mentioned, the packet header can be split into fields and specified separately, such as IP source and destination addresses, protocol, L4 port numbers etc. This is shown in FIG. 6. While there are many ways of splitting the packet header, it is desirable to split the header into consistent bit sizes. Preferably, the bit size is 16 bits, one reason being that the port numbers are 16 bits, and port numbers are dealt with differently to that of the IP addresses. Specifically, port numbers do not have a value/mask arrangement, but have numeric ranges; it is much more convenient to deal with them as a single value rather than splitting them up.

In the example where each block is 16 bits, some smaller header fields are grouped together to form a 16 bit block and the TCP flags section only uses 2 bits. For protocols such as Internet Control Message Protocol (ICMP), the source port block can be reused as the ICMP type fields. Correspondingly, each rule in the ACL is split into 8 blocks, with each block associated with a field block.

Given a sample set of access lists below:
access-list 101 deny tcp 192.100.1.0 255.255.255.0 eq smtp
access-list 101 permit ip 192.100.1.0 255.255.255.0
access-list 101 permit ip 192.101.1.0 255.255.255.0
access-list 101 deny tcp any any eq 21
access-list 101 deny udp any any eq 80

Taking one of these blocks as an example, such as the first 16 bits of the IP source address, the access list entries often contain repeated or wildcard entries, thus the following ruleset can be formed:

TABLE 1

| Rule Number | Value | Mask |
|---|---|---|
| 1 | 192.100 | 255.255 |
| 2 | 192.100 | 255.255 |
| 3 | 192.101 | 255.255 |
| 4 | 0.0 | 0.0 |
| 5 | 0.0 | 0.0 |

The rule is processed by creating a data structure termed an "equivalence set." Basically, an equivalence set is a set of unique values that exist across all rules for a particular field. For each entry in the equivalence set, an indication is kept of which rules this entry represents, the rationale being that a value may appear in more than one rule. For example, 192.100/255.255 value above appears in both rule 1 and rule 2. By using a bitmap, rules associated with each equivalence set may be tracked. Each equivalence set entry is assigned an identifying index. So for the example above, the following equivalence set is created as shown in table 2:

TABLE 2

| Equivalence set Index | Value/mask | ACL entries (bitmap) 1 2 3 4 5 |
|---|---|---|
| 0 | 192.100/255.255 | 1 1 0 0 0 |
| 1 | 192.101/255.255 | 0 0 1 0 0 |
| 2 | 0.0/0.0 | 0 0 0 1 1 |

By comparing table 1 with table 2, a compression has taken place in that out of the 5 rules, within this field there are only 3 possible outcomes. Thus, after determining how many unique intervals (rules) there are in the scale from 0 to $2^{16}-1$, the preliminary equivalence set reduces the original rules down to a minimal data set. This concept is used to build first level lookup tables that map the 16 bit packet values to a smaller index value.

Figure 7:
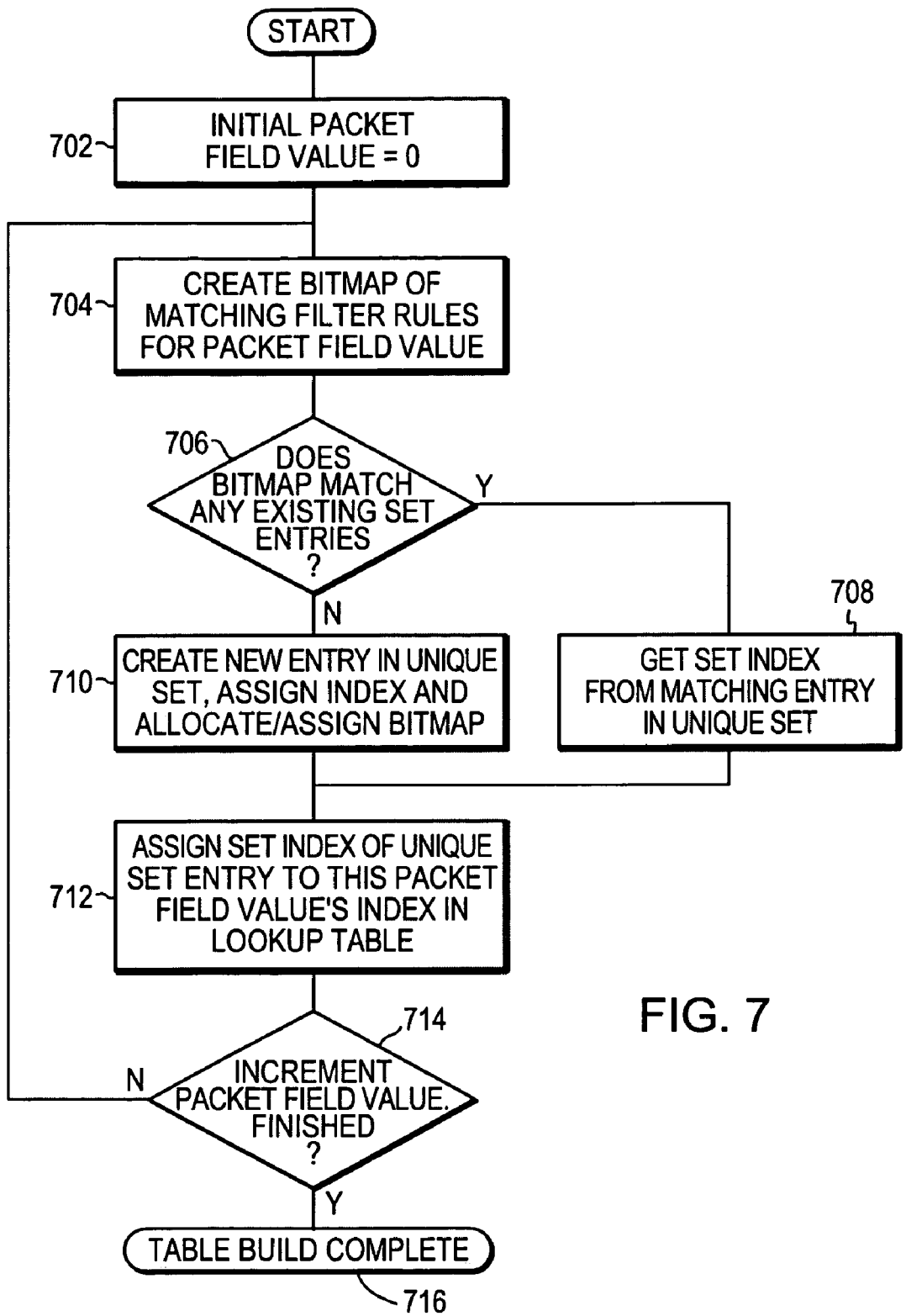
FIG. 7 shows an exemplary flow diagram that depicts the creation of the first data lookup tables.

As shown in FIG. 7, in step 702, the first level lookup table is built by iterating from 0 to a maximum value of the packet header field being processed, which in this instance is 65536 possible values. The following steps occur for each iteration. In step 704, a bitmap is created representing which filter rules match this particular packet header field value. Further representation of the filter rules by the bitmap will be described with respect to FIG. 8. In step 706, the created bitmap is compared with other previously created bitmaps for this field, if any, to determine if there is a matching bitmap. If a matching bitmap is found, in step 708, the equivalence set index of the matching bitmap is assigned to the packet header field value currently being processed. Otherwise, if there are no matching bitmaps, in step 710, a new entry is created which has a new equivalence set index value and has the created bitmap assigned to it, shown in step 712. In step 714, the packet field value is incremented and the process is repeated until the last iteration value has been reached. In step 716, the equivalence set index values and their corresponding bitmaps are used to form the first level lookup table.

Figure 8:
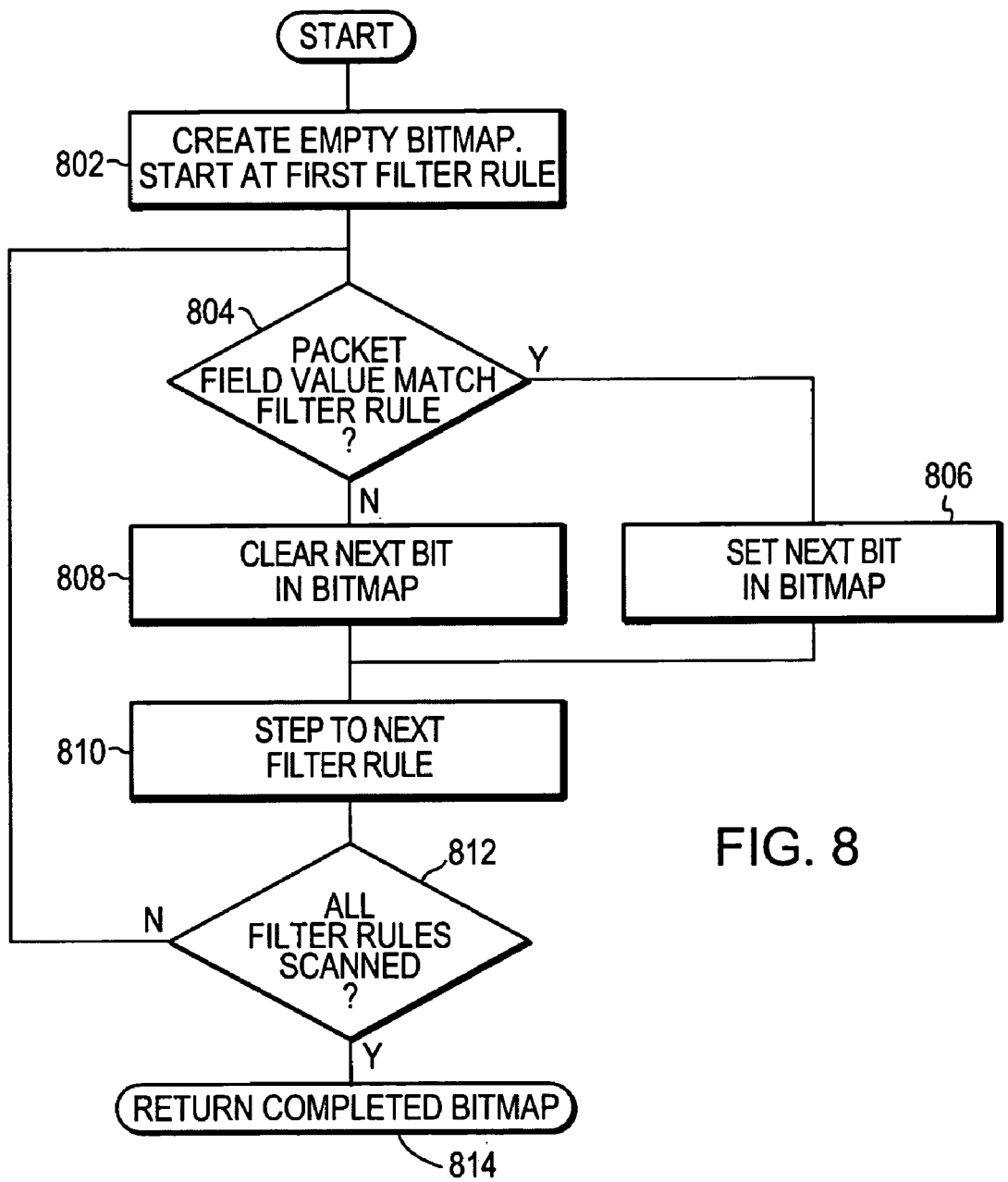
FIG. 8 shows an exemplary flow diagram that depicts the creation of bitmaps for a packet header field value.

FIG. 8 represents a flow diagram that shows the creation of a bitmap for a packet header field value. In step 802, an empty bitmap is created in which the number of bits represent the number of filtering rules applicable to the packet header. In step 804, for a particular field value, the filter rules are scanned from the first to the last to determine which rules match. In step 806, when a value matches the rule being tested, the bit that corresponds to that rule is set. Alternatively, if the value does not match the rule, then the bit remains clear to indicate that the rule does not match, shown in step 808.

In steps 810–812, the next rule is tested against the packet header field value until all the rules have been scanned. In step 814, the completed bitmap now represents the filter rules that match the corresponding packet header field value. This process is repeated for each iterated field value.

Note that for field values such as an IP address, the value is considered to match an entry if that packet header value is covered by that entry's value/mask. For port numbers, instead of value/mask, a numeric range is used.

An example of the new equivalence set is shown below:

TABLE 4

| First level lookup Table index values | Equivalence set Index | ACL entries (bitmap) 1 2 3 4 5 |
|---|---|---|
| 0–48995 | 0 | 0 0 0 1 1 |
| 48996 (192.100) | 1 | 1 1 0 1 1 |
| 48997 (192.101) | 2 | 0 0 1 1 1 |
| 48998–65535 | 0 | 0 0 0 1 1 |

For each possible value of the 16 bit field of the packet header being processed, there is an equivalence set index, and the equivalence set entry associated with this index contains a bitmap of which ACL rules match this value. Note that the size of the original equivalence set being scanned for matching entries is generally small, and the bitmap processing optimizes the creation of new entries. Hashing of the bitmap may be used in ACLs that have a large number of rules (and thus a long bitmap) or is too complex to be reduced to bitmaps as not to cause excessive processing. They may also be stored and addressed separately. Note further that the new equivalence set has no relationship to the original equivalence set. A variation of this process could directly scan the rules and set the bitmap bit accordingly, without the creation of a preliminary equivalence set. Which is more efficient depends entirely on the complexity and size of the rule set.

An equivalence set is built for each of the 8 fields and results in 8 first level lookup tables, with all the entries in the lookup tables referring to the indices of the 8 equivalence sets associated with each packet field.

The next step combines these 8 separate equivalence sets through a technique known as "cross-producting" to a set of 4 intermediate lookup tables and equivalence sets. These are further reduced so that eventually only a single table is left, which is the final lookup table.

The cross-producting operates by creating a yet another equivalence set, iterating through the two sets being combined and creating a cross-product of all the possible outcomes.

Figure 9:
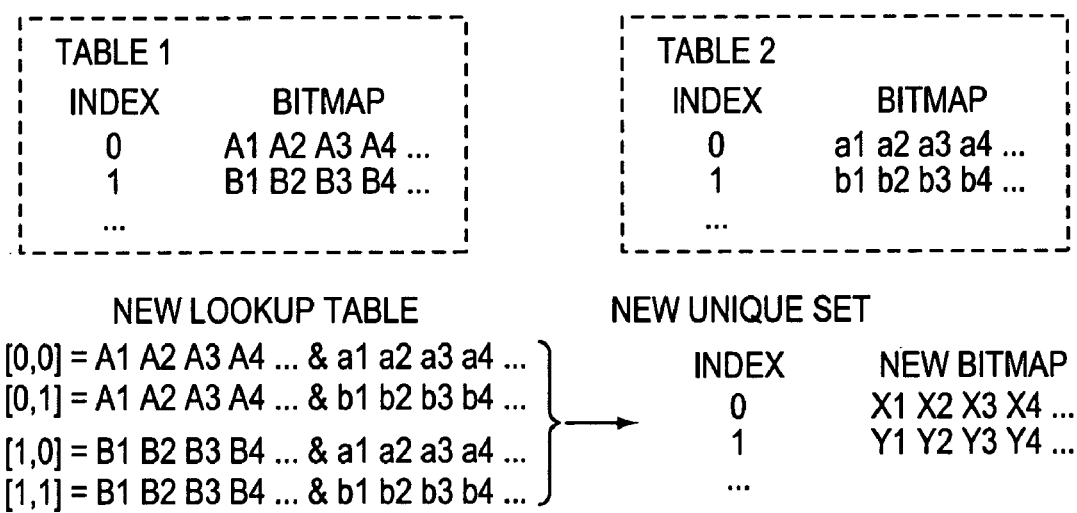
FIG. 9 illustrates two data lookup tables being merged via cross-producting.
Figure 10:
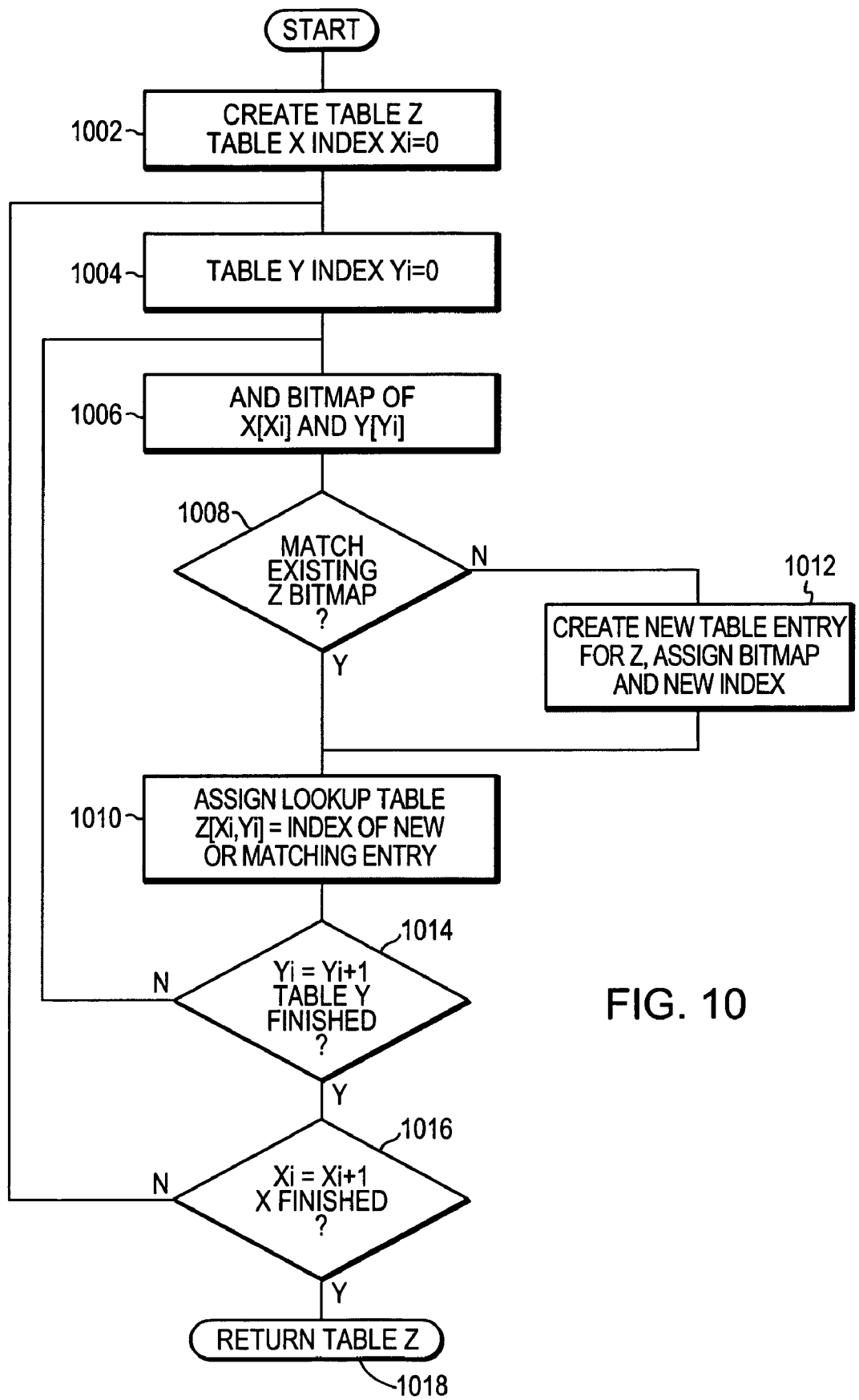
FIG. 10 shows an exemplary flow diagram that depicts the creation of the subsequent levels of data lookup table.

FIG. 9 shows a creation of a next level data lookup table by cross-producting two lookup data tables to be merged and is further described with respect to the flow diagram in FIG. 10. In step 1002, a new data table (table Z) is created, the size of the table being a product of the sizes of the two tables being merged. The index values are iterated for one of the tables (table X) to be merged. In step 1004, for each iterated value of table X, the index values of the other table (table Y) are also iterated. In step 1006, for each iterated index value of table Y, an AND operation is performed on the bitmaps associated with the indices of table X and Table Y to form a new bitmap to be allocated to table Z. In step 1008, the newly created bitmap is compared with the previously created bitmaps, if any, allocated to table Z to determine if there is a match. If there is a match, then in step 1010, the created bitmap is assigned the equivalence set index value of the matched bitmap. Otherwise, in step 1012, a new equivalent set index value is assigned to the created bitmap. The bitmap is then allocated to Table Z. In steps 1014–1016, the process is repeated for the iterations of the index values of table Y constituting the inner loop and the iterations of the index values of table X constituting the outer loop. Once all the iterations are complete, in step 1018, the lookup data table Z represents the merged result of the two tables (table X and Table Y). Note that this is in effect finding the intersection of the two entries, and the bits are set in the bitmap only when both contributing entries have the bits set. This discovers the set of ACL rules that match for the particular two values of the contributing equivalence set.

In essence, what the crossproducting is doing is performing a intersection on the regions covered by the two equivalence sets, and creating a new equivalence set representing all the possible outcomes of the combination of any values in the two packet fields. As an example, refer to FIG. 11 to consider a packet with the IP source address of 192.101.1.20 which is used as input during runtime lookup. Using the two 16 bit blocks as indices into the two first level tables for each of these fields (i.e., upper 16 bits of IP source and lower 16 bits of IP source address), the upper 16 bits would return an equivalence set index of 2, and the lower 16 bit lookup would return a value of 1. To use these results to look up the next level, the two results are used as index values into the next level's lookup table, obtaining a result of 2. The bitmap associated with this equivalence set entry shows that the rules matching this packet are rules 3, 4, and 5.

As can be seen, though the theoretical maximum size of the new equivalence set is 6, the actual number of possible outcomes is lower (3 in this case) because at each level there is commonality across the rules. If every rule was different from every other in every field, there is no compression, but the nature of the rules (describing real filters for real packets) usually allows high levels of compression to be achieved.

This final equivalence set provides all the theoretical possible combinations of rules given any packet header values, and for any of these possible outcomes, there is a bitmap indicating which rules are matching. By doing a find-first-set on the bitmap, the first matching rule can be obtained. Because the bitmaps provide a list of all the rules that match a packet, it is possible to employ this in other ways, such as choosing the best match, or using the list as a set of signatures to check for in intrusion detection. The final lookup can also contain the ACL entry index or a pointer to the actual matching ACL entry to avoid the overhead of searching for the first bit set.

Once the first and intermediate data lookup tables are built, the bitmaps are no longer necessary and only the equivalence set indices are maintained. The first level lookup tables also include the field values that point to their respective indices. Note that full bitmaps need not be retained in the final lookup table, but the bitmaps can be customized according to the requirements of the classifying device. For instance, if the first matching rule is the only relevant classification, the bitmaps need not contain the full matching rule set but only the first matching rule. Thus, the bitmaps can be customized according to the classification rule.

Figure 12:
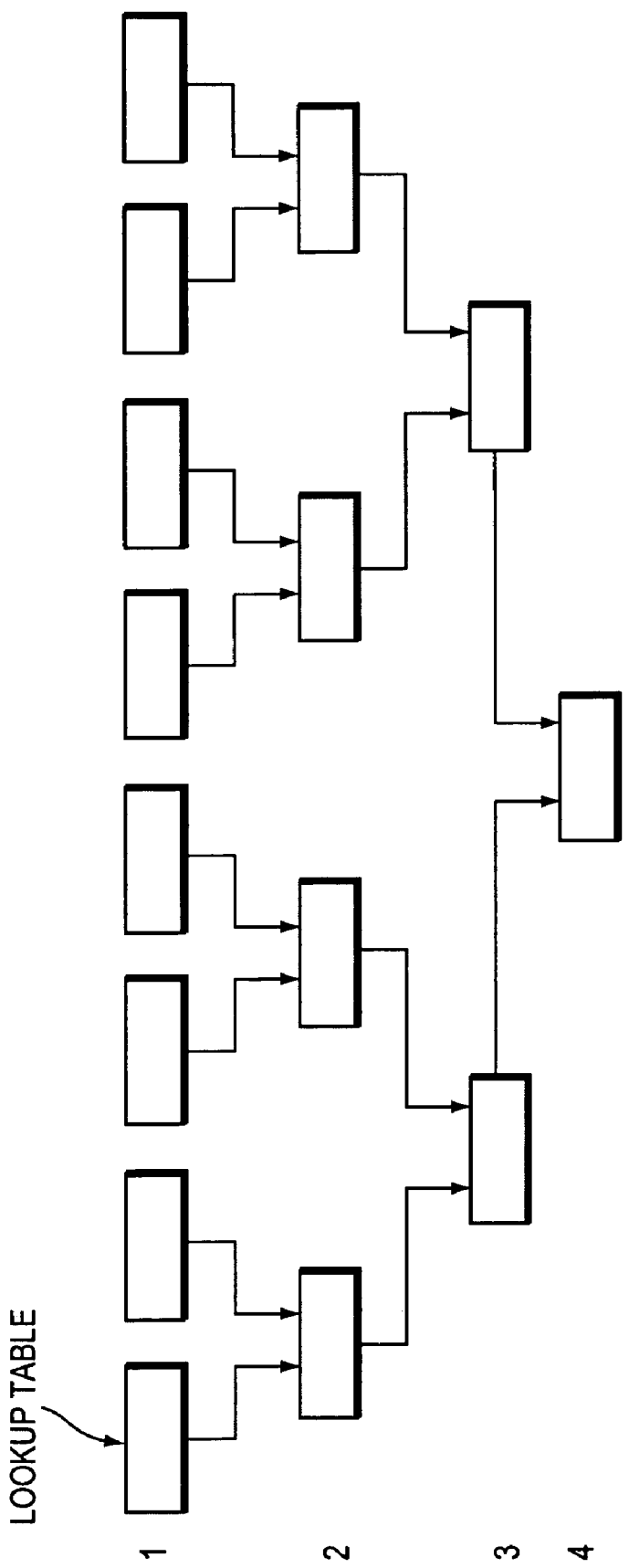
FIG. 12 illustrates a lookup table hierarchy suitable for implementation in hardware.

At packet classification time, a packet field value is sectioned into fields and entered into their respective first level lookup tables, which generate the corresponding equivalent indices for those fields. Those indices enter their corresponding intermediate second level tables, which generate equivalent second level indices that are entered into the next intermediate tables, if any. This repeats until the final lookup table is indexed, which generates the corresponding bitmap representing matching rules for the packet field value. Thus, if 8 fields are employed, a total of 15 lookups will return the matching ACL entry, regardless of the number of rules in the ACL if the classification is done in software and performed sequentially. It is straightforward, however, to build the lookup tables in hardware such as a Flash memory, a CAM or an ASIC. In this situation, the 8 first level lookups can be done in parallel, and the results fed directly to the second level lookups and etc. In other words, the various levels of the lookup tables are arranged in a hierarchy wherein the output of the lookup tables in one level are forwarded to the corresponding lookup tables in the next level and so forth as shown in FIG. 12. Thus, a packet can be classified in a time of only 4 memory lookups expediting the classification process.

Representing packet classification rules as bitmaps which are indexed by lookup tables for packet classifications has been described. It will however be apparent that other variations and modifications may be made to the described embodiments, with attainment of some or all of their advantages. Therefore, it is the object of the appended claims to cover all such variations and modifications within the true spirit and scope of the invention.

What is claimed is:

1. A method for use with classifying packets, comprising:
    creating a plurality of logical segments, each of the logical segments corresponding to a portion of a packet header;
    iterating values in each of the plurality of logical segments from zero to a maximum value;
    creating a bitmap for each of the iterated values, each bitmap having one or more bits, each bit corresponding to a rule, each bit indicating whether a rule applies to the iterated value; and
    grouping, to create an equivalency set for each of the plurality of logical segments, ranges of iterated values having equivalent bitmaps into one or more index sets, each index set having an index number.

2. The method as in claim 1, further comprising: crossproducting the equivalency sets of each of the plurality of logical segments to create intermediate equivalency sets.

3. The method as in claim 2, wherein the step of crossproducting further comprises:
    performing an AND operation on the bitmap of each of the one or more index sets of two or more equivalency sets to create one or more new bitmaps; and
    grouping, to create a new equivalency set for each AND operation, equivalent new bitmaps into one or more new index sets, each index set having an index number.

4. The method as in claim 2, further comprising: continuing the step of crossproducting until a final equivalency set is created, the final equivalency set having one or more final bitmaps.

5. The method as in claim 4, further comprising:
    receiving a packet having a packet header;
    dividing the packet header into the plurality of logical segments, each logical segment having a value; and
    determining which rules apply to the packet by,
        i) looking up the index set to which the value of each of the logical segments belongs,
        ii) looking up the cross-producted relationships until the final equivalency set is reached, and
        iii) looking up a corresponding final bitmap.

6. The method as in claim 1, further comprising: storing, as lookup tables, all of the index numbers of the equivalency sets and their cross-producted relationships.

7. The method as in claim 6, further comprising: deleting, from the equivalency sets, all bitmaps but the one or more final bitmaps.

8. The method as in claim 1, further comprising: using 16-bit segments as the plurality of logical segments.

9. The method as in claim 1, further comprising: dividing the packet header into a plurality of logical segments including fields selected from the group consisting of:
    source address, destination address, protocol, type of service (TOS), precedence, source port number, destination port number, and flags.

10. A method for classifying a packet using rules, comprising:
    receiving a packet having a packet header;
    dividing the packet header into a plurality of logical segments, each logical segment having a value; and
    determining which rules apply to the packet by,
        i) looking up a predetermined range to which the value of each of the logical segments belongs, the range corresponding to a predetermined index set,
        ii) looking up predetermined cross-producted relationships based on the predetermined index sets to reach a final cross-producted relationship, and
        iii) looking up a final bitmap corresponding to the final cross-producted relationship, the final bitmap having one or more bits, each bit corresponding to a rule, each bit indicating whether a rule applies to the packet.

11. The method as in claim 10, further comprising: using lookup tables, the lookup tables storing all of the index numbers of the equivalency sets and their crossproducted relationships.

12. The method as in claim 10, further comprising: using 16-bit segments as the plurality of logical segments.

13. The method as in claim 10, further comprising: dividing the packet header into a plurality of logical segments including fields selected from the group consisting of:
    source address, destination address, protocol, type of service (TOS), precedence, source port number, destination port number, and flags.

14. A computer, comprising:
   means for creating a plurality of logical segments, each of the logical segments corresponding to a portion of a packet header;
   means for iterating values in each of the plurality of logical segments from zero to a maximum value;
   means for creating a bitmap for each of the iterated values, each bitmap having one or more bits, each bit corresponding to a rule, each bit indicating whether a rule applies to the iterated value; and
   means for grouping, to create an equivalency set for each of the plurality of logical segments, ranges of iterated values having equivalent bitmaps into one or more index sets, each index set having an index number.

15. A computer readable media, comprising: the computer readable media containing instructions for execution on a processor for the practice of the method of,
   creating a plurality of logical segments, each of the logical segments corresponding to a portion of a packet header;
   iterating values in each of the plurality of logical segments from zero to a maximum value;
   creating a bitmap for each of the iterated values, each bitmap having one or more bits, each bit corresponding to a rule, each bit indicating whether a rule applies to the iterated value; and
   grouping, to create an equivalency set for each of the plurality of logical segments, ranges of iterated values having equivalent bitmaps into one or more index sets, each index set having an index number.

16. Electromagnetic signals propagating on a computer network, comprising: the electromagnetic signals carrying instructions for execution on a processor for the practice of the method of,
   creating a plurality of logical segments, each of the logical segments corresponding to a portion of a packet header;
   iterating values in each of the plurality of logical segments from zero to a maximum value;
   creating a bitmap for each of the iterated values, each bitmap having one or more bits, each bit corresponding to a rule, each bit indicating whether a rule applies to the iterated value; and
   grouping, to create an equivalency set for each of the plurality of logical segments, ranges of iterated values having equivalent bitmaps into one or more index sets, each index set having an index number.

17. A computer, comprising:
   means for receiving a packet having a packet header;
   means for dividing the packet header into a plurality of logical segments, each logical segment having a value; and
   means for determining which rules apply to the packet by,
      i) looking up a predetermined range to which the value of each of the logical segments belongs, the range corresponding to a predetermined index set,
      ii) looking up predetermined cross-producted relationships based on the predetermined index sets to reach a final cross-producted relationship, and
      iii) looking up a final bitmap corresponding to the final cross-producted relationship, the final bitmap having one or more bits, each bit corresponding to a rule, each bit indicating whether a rule applies to the packet.

18. A computer readable media, comprising: the computer readable media containing instructions for execution on a processor for the practice of the method of,
   receiving a packet having a packet header;
   dividing the packet header into a plurality of logical segments, each logical segment having a value; and
   determining which rules apply to the packet by,
      i) looking up a predetermined range to which the value of each of the logical segments belongs, the range corresponding to a predetermined index set,
      ii) looking up predetermined cross-producted relationships based on the predetermined index sets to reach a final cross-producted relationship, and
      iii) looking up a final bitmap corresponding to the final cross-producted relationship, the final bitmap having one or more bits, each bit corresponding to a rule, each bit indicating whether a rule applies to the packet.

19. Electromagnetic signals propagating on a computer network, comprising: the electromagnetic signals carrying instructions for execution on a processor for the practice of the method of,
   receiving a packet having a packet header;
   dividing the packet header into a plurality of logical segments, each logical segment having a value; and
   determining which rules apply to the packet by,
      i) looking up a predetermined range to which the value of each of the logical segments belongs, the range corresponding to a predetermined index set,
      ii) looking up predetermined cross-producted relationships based on the predetermined index sets to reach a final cross-producted relationship, and
      iii) looking up a final bitmap corresponding to the final cross-producted relationship, the final bitmap having one or more bits, each bit corresponding to a rule, each bit indicating whether a rule applies to the packet.

20. A method for setting up lookup tables for classification of packets, comprising:
   A. establishing a plurality of fields for a header of a packet of the type to be classified;
   B. inserting a first value into the first field;
   C. comparing the first value with each of a plurality of rules, there being an established number of rules in the plurality of rules;
   D. setting a bit in a bitmap, the bitmap having a plurality of bits, each bit corresponding to each rule of the plurality of rules, the bit being set in the event that the corresponding rule applies to the first value;
   E. repeating steps B, C, and D for each possible value which can be in the first field to create a bitmap for each possible value;
   F. grouping the bitmaps into sets, a set having equal values of the bits in the bitmap;
   G. assigning a label to each set; and
   H. repeating steps B, C, D, E, F, and G for each field.

21. The method as in claim 20, further comprising:
   I. logically combining the sets of one or more fields with the sets of one or more other fields to create intermediate sets.

22. The method as in claim 21, further comprising:
   logically combining the sets by performing an AND operation on the bitmaps of the sets to create new bitmaps; and
   grouping the new bitmaps into intermediate sets.

23. The method as in claim 21, further comprising: logically combining intermediate sets until a final set is created, the final set having one or more final bitmaps.

24. The method as in claim 23, further comprising: storing the sets in a plurality of lookup tables.

25. The method as in claim 23, further comprising: deleting, from the sets, all bitmaps but the one or more final bitmaps.

26. The method as in claim 25, further comprising:
receiving a packet having a packet header;
dividing the packet header into the plurality of fields, each field having a value; and
determining which rules apply to the packet by,
  i) looking up the set to which the value of each field belongs,
  ii) looking up the logical combinations of set labels until the final set is reached, and
  iii) looking up a corresponding final bitmap.

27. A computer, comprising:
A. means for establishing a plurality of fields for a header of a packet of the type to be classified;
B. means for inserting a first value into the first field;
C. means for comparing the first value with each of a plurality of rules, there being an established number of rules in the plurality of rules;
D. means for setting a bit in a bitmap, the bitmap having a plurality of bits, each bit corresponding to each rule of the plurality of rules, the bit being set in the event that the corresponding rule applies to the first value;
E. means for repeating steps B, C, and D for each possible value which can be in the first field to create a bitmap for each possible value;
F. means for grouping the bitmaps into sets, a set having equal values of the bits in the bitmap;
G. means for assigning a label to each set; and
H. means for repeating steps B, C, D, E, F, and G for each field.

28. A computer readable media, comprising: the computer readable media containing instructions for execution on a processor for the practice of the method of,
A. establishing a plurality of fields for a header of a packet of the type to be classified;
B. inserting a first value into the first field;
C. comparing the first value with each of a plurality of rules, there being an established number of rules in the plurality of rules;
D. setting a bit in a bitmap, the bitmap having a plurality of bits, each bit corresponding to each rule of the plurality of rules, the bit being set in the event that the corresponding rule applies to the first value;
E. repeating steps B, C, and D for each possible value which can be in the first field to create a bitmap for each possible value;
F. grouping the bitmaps into sets, a set having equal values of the bits in the bitmap;
G. assigning a label to each set; and
H. repeating steps B, C, D, E, F, and G for each field.

29. Electromagnetic signals propagating on a computer network, comprising: the electromagnetic signals carrying instructions for execution on a processor for the practice of the method of,
A. establishing a plurality of fields for a header of a packet of the type to be classified;
B. inserting a first value into the first field;
C. comparing the first value with each of a plurality of rules, there being an established number of rules in the plurality of rules;
D. setting a bit in a bitmap, the bitmap having a plurality of bits, each bit corresponding to each rule of the plurality of rules, the bit being set in the event that the corresponding rule applies to the first value;
E. repeating steps B, C, and D for each possible value which can be in the first field to create a bitmap for each possible value;
F. grouping the bitmaps into sets, a set having equal values of the bits in the bitmap;
G. assigning a label to each set; and
H. repeating steps B, C, D, E, F, and G for each field.

30. A computer for use with classifying a packet, comprising:
a memory to store,
  i) a plurality of first lookup tables, each of the plurality of first lookup tables having a plurality of predetermined first index sets, the plurality of predetermined index sets corresponding to predetermined ranges of possible values for logical segments of a packet header,
  ii) a plurality of intermediate lookup tables, each of the plurality of intermediate lookup tables having a plurality of predetermined intermediate index sets, the plurality of predetermined intermediate index sets corresponding to predetermined cross-producted relationships between the predetermined first index sets, and
  iii) a final lookup table, the final lookup table having a plurality of predetermined final index sets, the plurality of final index sets corresponding to predetermined cross-producted relationships between the predetermined intermediate index sets, each of the predetermined final index sets having a final bitmap, the final bitmap having one or more bits, each bit corresponding to a rule, each bit indicating whether a rule applies to the packet.

31. The computer as in claim 30, further comprising:
a port to receive a packet having a packet header; and
a processor to divide the packet header into a plurality of logical segments, each logical segment having a value, and to determining which rules apply to the packet by,
  i) looking up the first lookup tables to determine a predetermined first index set to which the value of each of the logical segments belongs,
  ii) looking up the intermediate lookup tables to determine the corresponding intermediate index sets based on the first index sets to which the value of each of the logical segments belongs to reach a corresponding final index set, and
  iii) looking up a final bitmap corresponding to the final index set.

* * * * *